United States Patent
Park et al.

(10) Patent No.: US 12,512,543 B2
(45) Date of Patent: Dec. 30, 2025

(54) BATTERY MODULE AND BATTERY PACK INCLUDING THE SAME

(71) Applicant: LG ENERGY SOLUTION, LTD., Seoul (KR)

(72) Inventors: Subin Park, Daejeon (KR); Junyeob Seong, Daejeon (KR); Junkyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 881 days.

(21) Appl. No.: 17/770,217

(22) PCT Filed: Jan. 27, 2021

(86) PCT No.: PCT/KR2021/001048
§ 371 (c)(1),
(2) Date: Apr. 19, 2022

(87) PCT Pub. No.: WO2021/187747
PCT Pub. Date: Sep. 23, 2021

(65) Prior Publication Data
US 2022/0399604 A1 Dec. 15, 2022

(30) Foreign Application Priority Data
Mar. 17, 2020 (KR) .................. 10-2020-0032725

(51) Int. Cl.
*H01M 50/227* (2021.01)
*H01M 50/211* (2021.01)
*H01M 50/242* (2021.01)

(52) U.S. Cl.
CPC ....... *H01M 50/242* (2021.01); *H01M 50/211* (2021.01); *H01M 50/227* (2021.01)

(58) Field of Classification Search
CPC ............ H01M 50/242; H01M 50/211; H01M 50/227; H01M 50/249; H01M 50/271;
(Continued)

(56) References Cited

U.S. PATENT DOCUMENTS

| 9,343,772 B2 | 5/2016 | Byun |
| 2011/0143193 A1 | 6/2011 | Ahn |

(Continued)

FOREIGN PATENT DOCUMENTS

| CN | 201868485 U | 6/2011 |
| CN | 107104206 A | 8/2017 |

(Continued)

OTHER PUBLICATIONS

International Search Report for PCT/KR2021/001048 mailed on May 4, 2021.

(Continued)

*Primary Examiner* — Muhammad S Siddiquee
(74) *Attorney, Agent, or Firm* — Birch, Stewart, Kolasch & Birch, LLP

(57) ABSTRACT

A battery module includes a battery cell stack in which a plurality of battery cells are stacked, a first frame for covering a lower portion of the battery cell stack and a second frame for covering an upper portion of the battery cell stack. The first frame includes first side portions for covering both side surfaces of the battery cell stack. The second frame comprises second side portions for covering the first side portions, and wherein a side member is located between the first side portion and the second side portion.

10 Claims, 7 Drawing Sheets

(58) Field of Classification Search
CPC ........... H01M 50/224; H01M 2220/20; H01M 50/244; H01M 10/617; H01M 10/625; H01M 10/658; H01M 50/204; Y02E 60/10

See application file for complete search history.

(56) References Cited

U.S. PATENT DOCUMENTS

| | | |
|---|---|---|
| 2017/0033325 A1 | 2/2017 | Han et al. |
| 2017/0256761 A1 | 9/2017 | Ogawa et al. |
| 2018/0151855 A1 | 5/2018 | Iwasaki et al. |
| 2019/0267591 A1* | 8/2019 | Park .................... H01M 50/211 |
| 2019/0363392 A1 | 11/2019 | Kim et al. |
| 2020/0106058 A1* | 4/2020 | Kim .................... H01M 50/211 |
| 2020/0176745 A1 | 6/2020 | Lee |
| 2020/0220124 A1* | 7/2020 | Park .................... H01M 10/482 |
| 2020/0365853 A1 | 11/2020 | Hashimoto et al. |
| 2020/0411815 A1 | 12/2020 | Shin et al. |
| 2021/0036277 A1* | 2/2021 | Seo .................... H01M 10/48 |
| 2022/0166098 A1 | 5/2022 | Choi et al. |

FOREIGN PATENT DOCUMENTS

| | | |
|---|---|---|
| CN | 110168771 A | 8/2019 |
| CN | 113614990 A | 11/2021 |
| ES | 3 934 015 A1 | 1/2022 |
| JP | 2011-23268 A | 2/2011 |
| JP | 2014-35918 A | 2/2014 |
| JP | 2017-162810 A | 9/2017 |
| JP | 2018-60880 A | 4/2018 |
| KR | 10-2011-0066448 A | 6/2011 |
| KR | 10-2012-0036743 A | 4/2012 |
| KR | 10-2017-0013591 A | 2/2017 |
| KR | 10-2018-0113416 A | 10/2018 |
| KR | 10-2019-0054709 A | 5/2019 |
| KR | 10-2019-0063809 A | 6/2019 |
| KR | 10-2019-0088802 A | 7/2019 |
| WO | WO 2017/026145 A1 | 2/2017 |
| WO | WO 2019/143029 A1 | 7/2019 |
| WO | WO 2019/155713 A1 | 8/2019 |

OTHER PUBLICATIONS

Extended European Search Report for European Application No. 21770946.8, dated Mar. 23, 2023.

* cited by examiner

Related Art

ABATTERY MODULE AND BATTERY PACK
INCLUDING THE SAME

CROSS CITATION WITH RELATED
APPLICATION(S)

This application claims the benefit of Korean Patent Application No. 10-2020-0032725 filed on Mar. 17, 2020 with the Korean Intellectual Property Office, the disclosure of which is incorporated herein by reference in its entirety.

TECHNICAL FIELD

The present disclosure relates to a battery module and a battery pack including the same, and more particularly, to a battery module that prevents deformation of the module structure due to swelling, and a battery pack including the same.

BACKGROUND ART

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and a battery case that seals and houses the electrode assembly together with an electrolyte solution.

Generally, the lithium secondary battery may be classified based on the shape of the exterior material into a can type secondary battery in which the electrode assembly is mounted in a metal can, and a pouch-type secondary battery in which the electrode assembly is mounted in a pouch made of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or in parallel to form a cell stack, thereby improving capacity and output. In addition, one or more battery modules may be mounted together with various control and protection systems such as BMS (battery management system) and a cooling system to form a battery pack.

FIG. 1 is a diagram showing a conventional battery module.

Referring to FIG. 1, the battery module may include a battery cell stack 12 formed by stacking a plurality of battery cells 11, a mono frame 20 of which a front surface and a rear surface are opened so as to house the battery cell stack 12, and an end plate 60 for covering a front surface and a rear surface of the mono frame 20. In order to form such a battery module, it is necessary to horizontally assemble the battery module such that the battery cell stack 12 is inserted into the opened front surface or rear surface of the mono frame 20 along the X-axis direction as shown by the arrow in FIG. 1. However, in order to stably perform such a horizontal assembly, a sufficient clearance has to be secured between the battery cell stack 12 and the mono frame 20. Here, the clearance refers to a gap generated by press-fitting and the like.

At this time, the height of the mono frame 20 must be designed large in consideration of the maximum height of the battery cell stack 12, an assembly tolerance in the insertion process, and the like, which may lead to generation of unnecessary wasted space.

In the process of repeatedly charging and discharging the plurality of battery cells 11, a phenomenon in which the internal electrolyte is decomposed and gas is generated, so that the battery cell 11 swells up, that is, a swelling phenomenon, may occur. When the plurality of battery cells 11 stacked at a high degree of integration swell up, there is a problem that only both side surfaces of the mono frame 20 have to withstand the pressure due to swelling.

However, when the thickness of the mono frame 20 is increased, the thickness of the upper surface and the lower surface, which is independent of the rigidity against the swelling phenomenon, is also increased, whereby the weight of the battery module is increased more than necessary, and the height is also increased, which is disadvantageous in terms of energy capacity.

Meanwhile, since the battery cell stack 12 is formed by compactly stacking a plurality of battery cells 11, a temperature deviation between the battery cells 11 of the battery cell stack 12 may be deepened. The temperature non-uniformity between the battery cells 11 may deteriorate the performance of the battery module and ultimately cause reduction of the lifespan.

DETAILED DESCRIPTION OF THE
INVENTION

Technical Problem

It is an object of the present disclosure to provide a battery module capable of controlling swelling and temperature deviation of the battery cells while minimizing the increase in weight or height, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked, a first frame for covering a lower portion of the battery cell stack; and a second frame for covering an upper portion of the battery cell stack, wherein the first frame includes first side portions for covering both side surfaces of the battery cell stack, wherein the second frame comprises second side portions for covering the first side portions, and wherein a side member is located between the first side portion and the second side portion.

The second frame may include a front portion and a rear portion that cover the front surface and the rear surface of the battery cell stack, respectively.

The side member may include polyurethane.

A battery body of the battery cell may be disposed in parallel with the first side portions, the second side portions, and the side member.

The side member may be a pad.

The battery may further include an end plate that covers the front surface and the rear surface of the battery cell stack.

The end plate may be joined by welding to at least one of the first frame and the second frame.

The battery module may further include a polymer resin layer formed on at least one of between the first side portion and the side member and between the second side portion and the side member.

The polymer resin layer may be formed by coating a polymer resin onto the side member.

Advantageous Effects

The battery module and the battery pack including the same according to embodiments of the present disclosure can adopt a double frame structure at a position adjacent to one surface of the battery cell stack on which a force due to swelling of the battery cells acts, thereby preventing deformation of the module structure due to the swelling while minimizing the increase in the weight or height of the battery module.

In addition, by providing a side member and interrupting heat transfer to the outside of the battery module, the temperature deviation between the battery cells can be reduced. This makes it possible to increase the performance and lifespan of the battery module.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
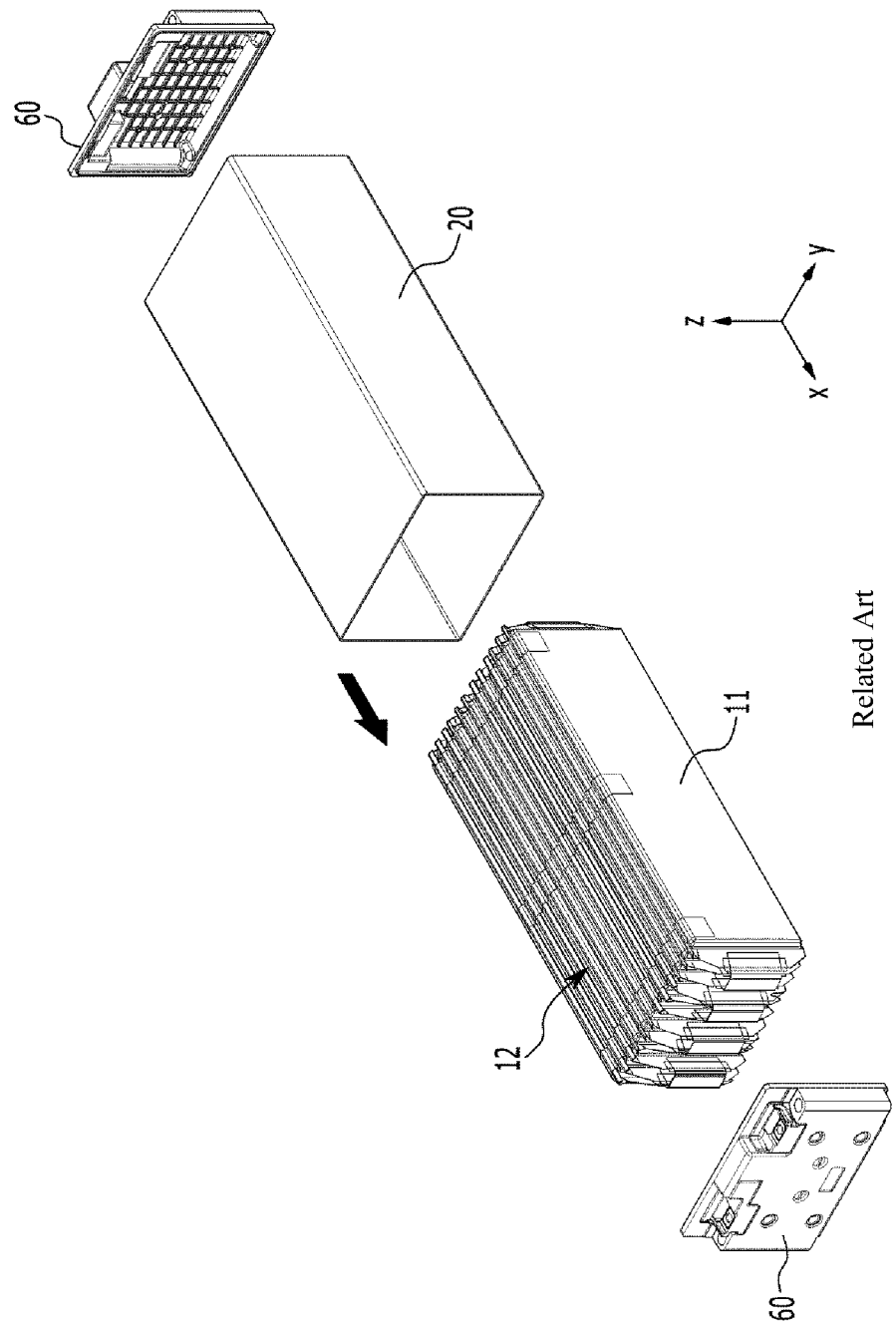
FIG. 1 is an exploded perspective view of a conventional battery module.

Hereinafter, various embodiments of the present disclosure will be described in detail with reference to the accompanying drawings so that those skilled in the art can easily implement them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 2:
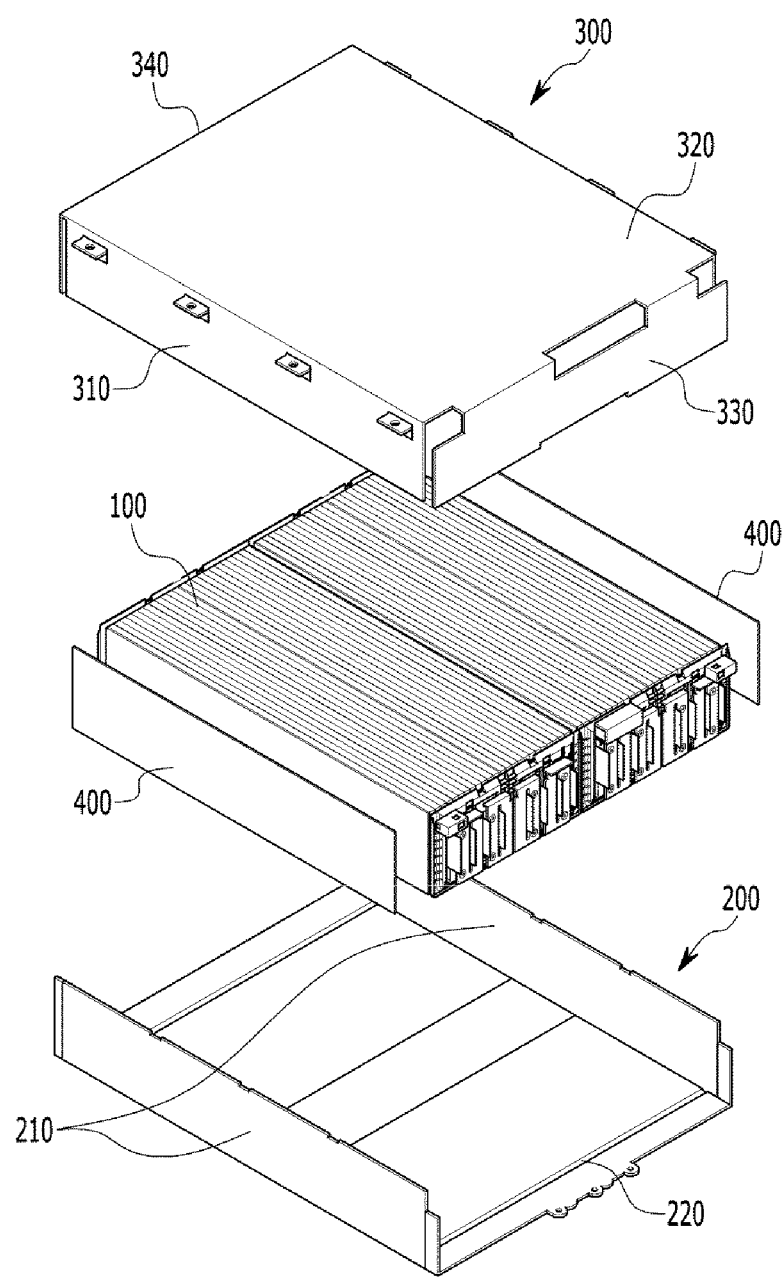
FIG. 2 is an exploded perspective view showing a battery module according to embodiments of the present disclosure.
Figure 3:
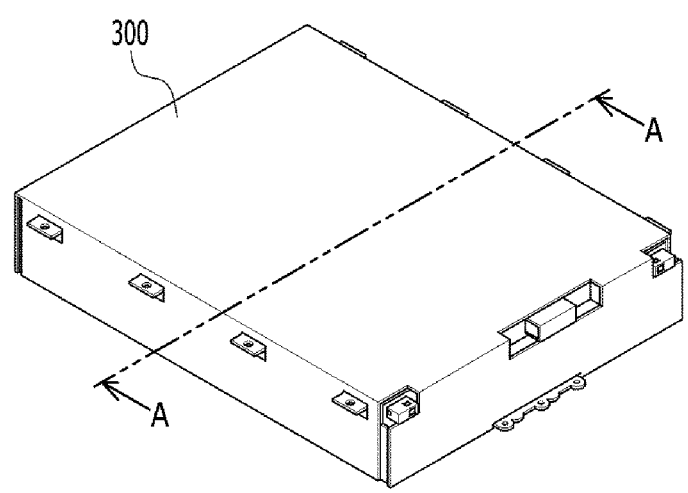
FIG. 3 is a view showing a state in which the battery module of FIG. 2 has been assembled.
Figure 4:
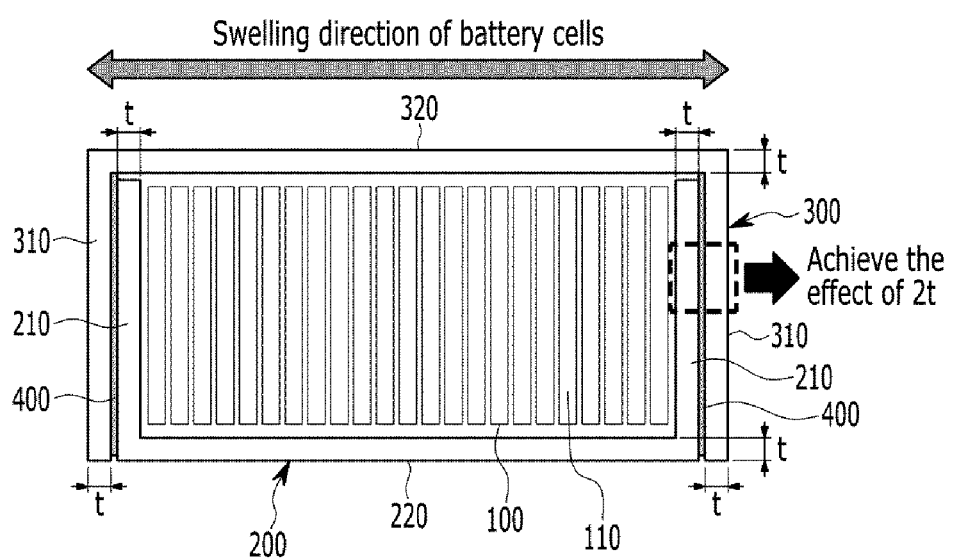
FIG. 4 is a section taken along line 4-4 of FIG. 3 and is a cross-sectional view of a battery module according to embodiments of the present disclosure.

FIG. 2 is an exploded perspective view showing a battery module according to embodiments of the present disclosure. FIG. 3 is a view showing a state in which the battery module of FIG. 2 has been assembled. FIG. 4 is a section taken along line 4-4 of FIG. 3 and is a cross-sectional view of a battery module according to embodiments of the present disclosure.

Referring to FIGS. 2 to 4, the battery module according to embodiments of the present disclosure includes a battery cell stack 100 in which a plurality of battery cells 110 are stacked, a first frame 200 for covering a lower portion of the battery cell stack 100, and a second frame 300 for covering an upper portion of the battery cell stack 100. The first frame 200 includes first side portions 210 for covering both side surfaces of the battery cell stack 100, the second frame 300 includes second side portions 310 for covering the first side portions 210, and a side member 400 is located between the first side portion 210 and the second side portion 310.

The first frame 200 may further include a bottom portion 220 that covers the lower surface of the battery cell stack 100. That is, the first frame 200 may be formed so as to cover both side surfaces and the lower surface of the battery cell stack 100. At this time, the first side portions 210 and the bottom portion 220 of the first frame 200 may be integrally formed.

The second frame 300 may further include a ceiling part 320 for covering the upper surface of the battery cell stack 100, a front portion 330 for covering the front surface of the battery cell stack 100, and a rear portion 340 for covering the rear surface of the battery cell stack 100. That is, the second frame 300 may be formed so as to cover both side surfaces, the upper surface, the front surface, and the rear surface of the battery cell stack 100. At this time, the second side portions 310, the ceiling portion 320, the front portion 330, and the rear portion 340 may be integrally formed.

According to embodiments of the present disclosure, the ceiling portion 320 of the second frame may be formed wider than the bottom portion 220 of the first frame 200, so that the second side portion 310 of the second frame 300 can cover the first side portion 210 of the first frame 200.

Figure 5:
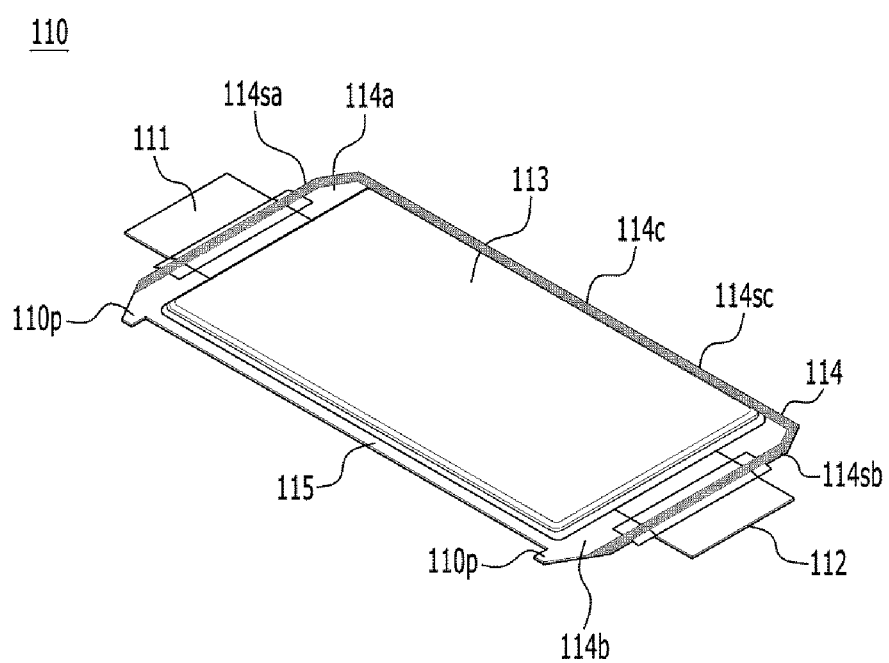
FIG. 5 is a perspective view showing a battery cell contained in the battery module of FIG. 2.

FIG. 5 is a perspective view showing a battery cell contained in the battery module of FIG. 2.

Referring to FIG. 5, the battery cell 110 according to embodiments of the present disclosure is preferably a pouch-type battery cell. For example, the battery cell 110 according to embodiments of the present disclosure has a structure in which two electrode leads 111 and 112 face each other and protrude from one end 114a and the other end 114b of the battery body 113, respectively. More specifically, the electrode leads 111 and 112 are connected to an electrode assembly (not shown), and protrude from the electrode assembly (not shown) to the outside of the battery cell 110.

Meanwhile, the battery cell 110 can be manufactured by joining both ends 114a and 114b of the battery case 114 and one side portion 114c connecting them in a state in which an electrode assembly (not shown) is housed in a battery case 114. In other words, the battery cell 110 according to embodiments of the present disclosure has a total of three sealing portions 114sa, 114sb and 114sc, and the sealing portions 114sa, 114sb and 114sc have a structure sealed by a method such as heat fusion, and the remaining other side portions may be formed of a connection portion 115. In addition, the connection portion 115 may extend long along one edge of the battery cell 110, and a protrusion portion 110p of the battery cell 110 called a bat-ear may be formed at the end of the connection portion 115.

The battery cells 110 may be stacked along the direction perpendicular to the first side portion 210 or the second side portion 310 to form the battery cell stack 100 as shown in FIG. 2. That is, the battery body 113 of the battery cell 110 may be disposed in parallel with the first side portions 210, the second side portions 310, and the side members 400 described later. Accordingly, the electrode leads 111 and 112 of the plurality of battery cells 110 may protrude toward the front portion 330 and the rear portion 340 of the second frame 300, respectively.

At this time, in the battery cell 110, the electrode may be expanded in a repetitive charge/discharge process, or an internal electrolyte may be decomposed due to a side reaction to generate gas. At this time, a phenomenon, in which the battery cell 110 swells up due to the electrode expansion and/or the generated gas, is called a swelling phenomenon. When the swelling phenomenon of battery cells 110 is deepened, it can change an appearance of the battery module and adversely affect the structural stability of the battery module or a battery pack including the same.

In particular, it is easily swollen up in the direction perpendicular to the battery body 113 rather than the direction parallel thereto. Therefore, the pressure due to the swelling of the battery cells 110 contained in the battery cell stack 100 can greatly act in the direction of the first side portion 210 and the second side portion 310.

Conventionally, a frame structure formed at a position adjacent to the battery cell stack along the stacking direction of the battery cells is formed as a single frame structure, so that there was difficulty in preventing structural deformation of the battery module during occurrence of the swelling.

Even if it was so, when the thickness of the frame is increased, the thickness of the upper surface and the lower surface, which is independent of the rigidity against the swelling phenomenon, is also increased, whereby the weight of the battery module is increased more than necessary, and the height is also increased, which is disadvantageous in terms of energy capacity.

In this regard, according to embodiments of the present disclosure, the first side portion 210 of the first frame 200 and the second side portion 310 of the second frame 300 can form a double frame structure with respect to the battery cell stack 100, thereby effectively preventing structural changes of the battery module due to the swelling of the battery cells 110.

In particular, both side portions of the frame can be mounted thicker so as to directly control the swelling phenomenon of the battery cell 110, and at the same time, the bottom portion and the ceiling portion, which are less related to the swelling, are mounted relatively thinly, and thus, it is possible to prevent the volume or weight of the battery module from being unnecessarily increased. That is, when the bottom portion 220 and the ceiling portion 320 have a first thickness t as shown in FIG. 4, the first side portion 210 and the second side portion 310 may be located together to achieve the effect of the second thickness $2t$ with respect to the lateral direction. In other words, the side thickness of the frame may be increased through the first side portion 210 and the second side portion 310 in consideration of the swelling direction of the battery cells 110.

Further, according to the present embodiment, a side member 400 is located between the first side portion 210 and the second side portion 310. This side member 400 can be in the form of a pad, and preferably, have a predetermined elastic force. In particular, the side member 400 may be in the form of a pad including foam. Since this side member 400 can effectively absorb the swelling of the battery cell 110, the structural stability of the battery module against the swelling of the battery cells 110 can be further improved.

That is, the rigidity of the frame with respect to the lateral direction in which the swelling of the battery cell 110 becomes mainly a problem can be increased through the first side portion 210 and the second side portion 310, and at the same time, the side member 400 can be located to effectively absorb the swelling of the battery cell 110.

Further, the space in which the first side portion 210 and the second side portion 310 are formed facilitates the arrangement of the pad-shaped side member 400 as in embodiments of the present disclosure.

The battery cell stack 100 is formed by compactly stacking a plurality of battery cells 110. Among them, the battery cell 110 located on the outermost side is greatly affected by the external environment, so that the temperature of the battery cell 110 located on the outermost side may be relatively low, whereby the temperature deviation between the battery cells 110 of the battery cell stack 100 can be deepened. The temperature non-uniformity between the battery cells 110 may cause reduction in the performance and lifespan of the battery module.

Therefore, the side member 400 according to embodiments of the present disclosure may be in the form of a pad, as described above, and can have heat insulation performance. By interrupting heat transfer to the outside of the battery module by these side members 400, the temperature deviation between the battery cells 110 can be reduced. Accordingly, it is possible to increase the performance and lifespan of the battery module.

The side member 400 as described above may include at least one of polyurethane and silicone-based materials, and more specifically, it may include a polyurethane foam. In addition, consequently, the side member 400 according to embodiments of the present disclosure can effectively absorb the swelling of the battery cell 110 and at the same time, can interrupt heat transfer to the outside of the battery module, thereby reducing a temperature deviation between the battery cells 110. However, the side member 400 of the present disclosure is not limited to the above-described materials.

Meanwhile, according to embodiments of the present disclosure, a battery module structure is formed so as to cover the battery cell stack 100 only with the two first and second frames 200 and 300, thereby integrating and simplifying the frame structure and reducing the number of frame components. Furthermore, since the assembling process of the frame components can be reduced, it is possible to drastically improve the problem of quality defect that may occur in the complicated assembly process.

According to embodiments of the present disclosure, the first frame 200 and the second frame 300 may be joined by welding. Specifically, the portion where respective lower ends of the second side portion 310, the front portion 330, and the rear portion 340 of the second frame 300, and the first frame 200 meet is welded to join the first frame 200 and the second frame 300. The thickness of the first frame 200 and the second frame 300 may be identical.

Meanwhile, the first frame 200 and the second frame 300 may be formed by a press method, and may be formed of the same material. This makes it possible to manufacture the first frame 200 and the second frame 300 by a single process when manufacturing frame parts, thereby simplifying the manufacturing process and reducing quality defects.

Meanwhile, the thickness of the side member 400 may have a predetermined thickness. Here, the thickness of the side member 400 refers to a width in a direction parallel to the swelling direction of the battery cell 110 in FIG. 4.

The thickness of the side member 400 may be designed in consideration of the number of battery cells 110, the number of side members 400, the maximum compression degree of the inside of the frame and the side member 400, and the like, and in one example, it may have a thickness of 2 mm to 3 mm. Here, the upper limit of 3 mm is a thickness that can pressurize the battery cell 110 at BOL (Begin of Life), and the lower limit of 2 mm is a thickness capable of absorbing the increase quantity in swelling of the battery cell 110 at EOL (End of Life).

Hereinafter, a battery module according to another embodiment of the present disclosure will be described with reference to FIG. 6.

Figure 6:
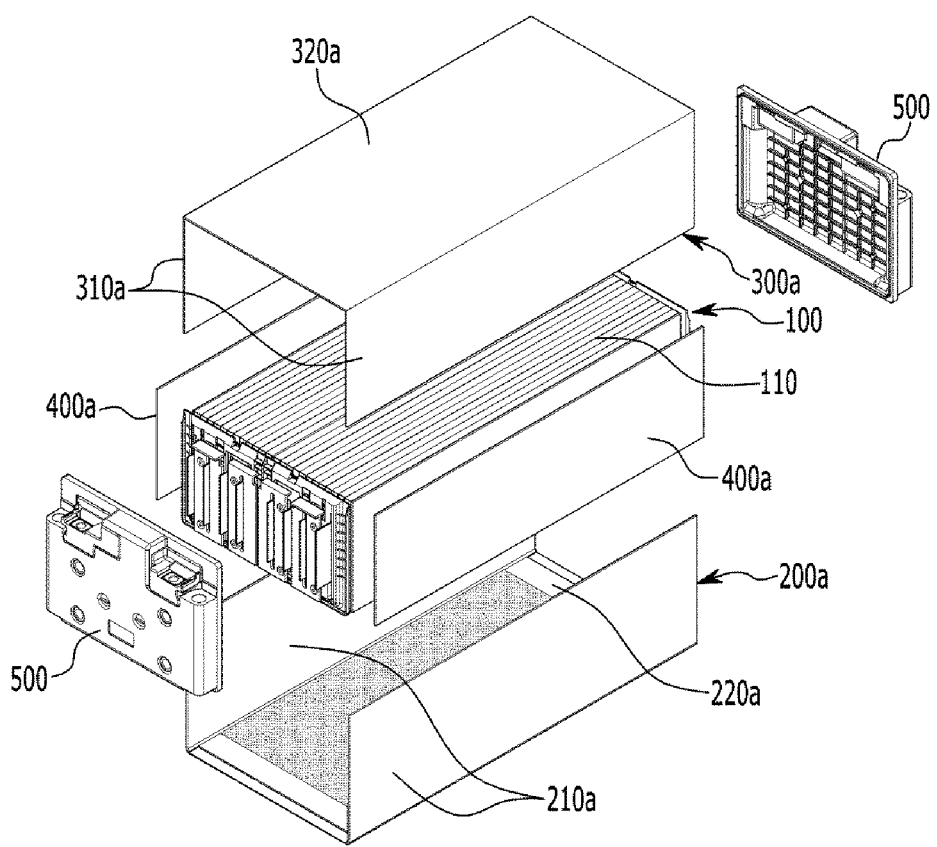
FIG. 6 is an exploded perspective view showing a battery module according to another embodiment of the present disclosure.

FIG. 6 is an exploded perspective view showing a battery module according to another embodiment of the present disclosure.

Referring to FIG. 6, the battery module according to embodiments of the present disclosure includes a battery cell stack 100 in which a plurality of battery cells 110 are stacked, a first frame 200a for covering the lower portion of the battery cell stack 100, and a second frame 300a for covering the upper portion of the battery cell stack 100.

The first frame 200a includes first side portions 210a for covering both side surfaces of the battery cell stack 100, the second frame 300a includes second side portions 310a for covering the first side portions 210a, and the side member 400a is located between the first side portion 210a and the second side portion 310a.

The first frame 200a may further include a bottom portion 220a for covering the lower surface of the battery cell stack 100, and the second frame 300a may further include a ceiling portion 320a for covering the upper surface of the battery cell stack 100.

The ceiling portion 320a of the second frame may be formed wider than the bottom portion 220a of the first frame 200, so that the second side portion 310a of the second frame 300a can cover the first side portion 210a of the first frame 200a.

According to embodiments of the present disclosure, both the first frame 200a and the second frame 300a may form an opened structure with respect to the front surface and the rear surface of the battery cell stack 100. The electrode leads of the battery cells 110 contained in the battery cell stack 100 may be located on the front surface and the rear surface of the battery cell stack 100.

The battery module according to embodiments of the present disclosure may include an end plate 500 for covering the front surface and the rear surface of the battery cell stack. Specifically, the end plate 500 may be located so as to cover the front surface and the rear surface of the battery cell stack 100.

The first frame 200a and the second frame 300a can be joined by welding. Specifically, a portion where the lower end of the second side portion 310a of the second frame 300a and the first frame 200a meet can be welded to join the first frame 200a and the second frame 300a.

Further, the end plate 500 may be joined by welding to at least one of the first frame 200a and the second frame 300a. Welding may be performed at a portion where each edge of the end plate 500 meets with at least one of the first frame 200a and the second frame 300a.

The first frame 200a, the second frame 300a, and the end plate 500 preferably have a predetermined strength to protect other electrical components including the battery cell stack 100 from external impact, and for this purpose, it may include a metal material, in particular aluminum.

The side member 400a according to embodiments of the present disclosure is located between the first side portion 210a and the second side portion 310a. The side member 400a can absorb swelling of the battery cells 110 and at the same time, interrupt heat transfer to the outside of the battery module, thereby reducing the temperature deviation between the battery cells 110. The details overlap with those described above and thus, are omitted.

Hereinafter, a battery module according to another embodiment of the present disclosure will be described with reference to FIG. 7.

Figure 7:
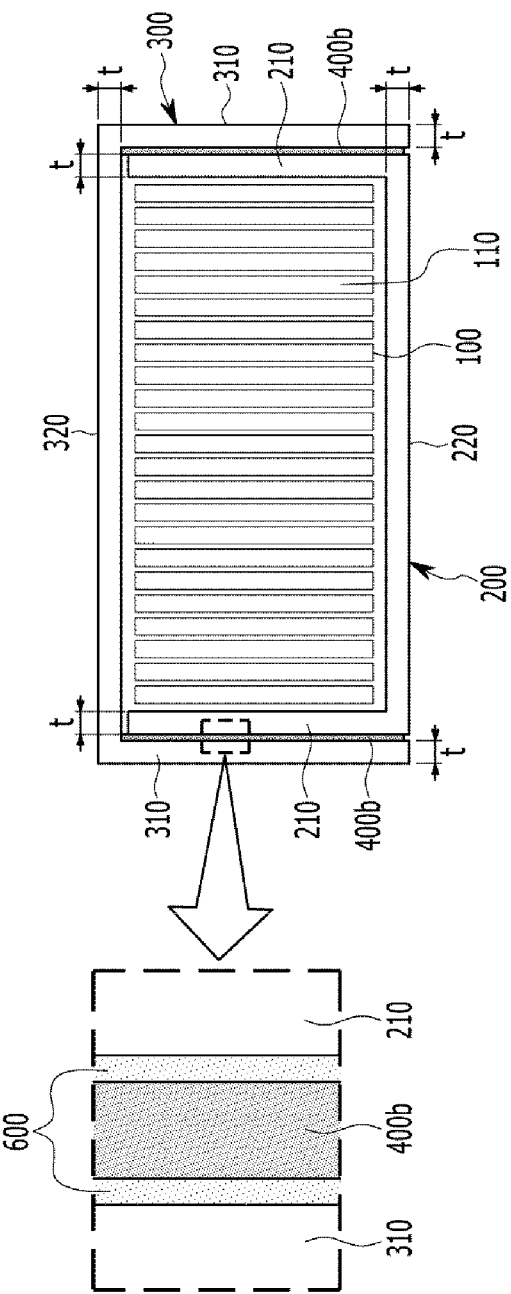
FIG. 7 is a cross-sectional view of a battery module according to yet another embodiment of the present disclosure.

FIG. 7 is a cross-sectional view of a battery module according to yet another embodiment of the present disclosure. In detail, it is a cross-sectional view of the battery module including the polymer resin layer 600.

Referring to FIG. 7, the battery module according to embodiments of the present disclosure includes a battery cell stack 100, a first frame 200 and a second frame 300, and a side member 400b is located between the first side portion 210 of the first frame 200 and the second side portion 310 of the second frame 300. The above configuration has been described above and thus, a detailed description thereof will be omitted.

At this time, according to embodiments of the present disclosure, the polymer resin layer 600 may be formed on at least one of between the first side portion 210 and the side member 400b and between the second side portion 310 and the side member 400b. FIG. 7 shows that the polymer resin layer 600 is formed both between the first side portion 210 and the side member 400b and between the second side portion 310 and the side member 400b, but the polymer resin layer 600 can be formed only in one of between the first side portion 210 and the side member 400b and between the second side portion 310 and the side member 400b.

The polymer resin layer 600 may be formed by coating a polymer resin onto the side member 400b, and more specifically, it may be formed by coating a polymer resin onto at least one of both surfaces of the side member 400b. The polymer resin is not particularly limited as long as it has a predetermined adhesive force, but it may be a silicone-based resin.

As the polymer resin layer 600 is formed, the side member 400b is fixed to the first side portion 210 or the second side portion 310 to be stably and firmly disposed between the first side portion 210 and the second side portion 310. That is, the fixing force to the side member 400b can be improved. Further, as mentioned above, the side member 400b interrupts heat transfer to the outside, thereby reducing the temperature deviation between the battery cells 110, As the polymer resin layer 600 is provided on the side member 400b, it may be more effective to interrupt heat transfer and reduce the temperature deviation between the battery cells 110.

The terms representing directions such as the front side, the rear side, the left side, the right side, the upper side, and the lower side have been used in embodiments of the present disclosure, but the terms used are provided simply for convenience of description and may become different according to the location of an object or an observer.

The one or more battery modules according to embodiments of the present disclosure described above can be mounted together with various control and protection systems such as a battery management system (BMS) and a cooling system to form a battery pack.

The battery module or the battery pack can be applied to various devices. For example, it can be applied to vehicle means such as an electric bike, an electric vehicle, and a hybrid electric vehicle, and may be applied to various devices capable of using a secondary battery, without being limited thereto.

The present disclosure has been described in detail with reference to exemplary embodiments thereof, but the scope of the present disclosure is not limited thereto and modifications and improvements made by those skilled in the part by using the basic concept of the present disclosure, which are defined in the following claims, also belong to the scope of the present disclosure.

DESCRIPTION OF REFERENCE NUMERALS

100: battery cell stack
200: first frame
210: first side portion
220: bottom portion
300: second frame
310: second side portion
320: ceiling portion
330: front portion
340: rear portion
400, 400a, 400b: side members
500: end plate
600: polymer resin layer

The invention claimed is:

1. A battery module comprising:
a battery cell stack in which a plurality of battery cells are stacked,
a first frame covering a lower portion of the battery cell stack; and
a second frame covering an upper portion of the battery cell stack,
wherein the first frame comprises first side portions for covering both side surfaces of the battery cell stack,
wherein the second frame comprises second side portions for covering the first side portions,
wherein a side member is located between each of the first side portions and the second side portions,
wherein the plurality of battery cells are stacked along a direction perpendicular to the first side portion or the second side portion to form the battery cell stack, and a battery body of each battery cell of the plurality of battery cells is parallel with the first side portions, the second side portions, and the side member, and
wherein the side member is formed of foam to absorb swelling of the battery cell stack.

2. The battery module of claim 1, wherein:
the second frame comprises a front portion and a rear portion that cover a front surface and a rear surface of the battery cell stack, respectively.

3. The battery module of claim 1, wherein:
the side member comprises polyurethane.

4. The battery module of claim 1, wherein:
the side member is a pad.

5. The battery module of claim 1, further comprising an end plate that covers a front surface and a rear surface of the battery cell stack.

6. The battery module of claim 5, wherein:
the end plate is joined by welding to at least one of the first frame and the second frame.

7. The battery module of claim 1, further comprising a polymer resin layer formed on at least one of between the first side portion and the side member and between the second side portion and the side member.

8. The battery module of claim 7, wherein:
the polymer resin layer is formed by coating a polymer resin onto the side member.

9. A battery pack comprising the battery module of claim 1.

10. The battery module of claim 1, wherein the plurality of battery cells are stacked in a first direction,
wherein the first side portions are spaced in the first direction,
wherein the first frame further comprises two open ends,
wherein the second frame further comprises first end portions for covering the open ends of the first frame.

* * * * *